United States Patent [19]

Renshaw

[11] 4,399,552
[45] Aug. 16, 1983

[54] CROSSTABLE X-RAY CASSETTE HOLDER

[76] Inventor: Governor K. Renshaw, 14448 Merced St., San Leandro, Calif. 94579

[21] Appl. No.: 348,600

[22] Filed: Feb. 12, 1982

Related U.S. Application Data

[63] Continuation-in-part of Ser. No. 166,609, Jul. 7, 1980, Pat. No. 4,333,014.

[51] Int. Cl.³ .................... G01N 21/01; G11B 1/00; G12B 9/00
[52] U.S. Cl. .................................... 378/167; 378/177
[58] Field of Search ............................... 378/167, 177

[56] References Cited

U.S. PATENT DOCUMENTS

| | | | |
|---|---|---|---|
| 2,651,725 | 9/1953 | McFarland | 378/177 |
| 2,876,359 | 3/1959 | Plymale | 378/177 |
| 3,916,207 | 10/1975 | Reed | 378/177 |
| 4,333,014 | 6/1982 | Renshaw | 378/177 |

Primary Examiner—Alfred E. Smith
Assistant Examiner—T. N. Grigsby
Attorney, Agent, or Firm—Alvin E. Hendricson

[57] ABSTRACT

An X-ray film cassette holder has adjustable end retaining means pivotally mounted on an end of a pivotally adjustable link that is adapted for clamping by a bottom plate and adjustable clamping plate to an edge of an X-ray table for positioning X-ray film for different angles of cross table radiography.

9 Claims, 5 Drawing Figures

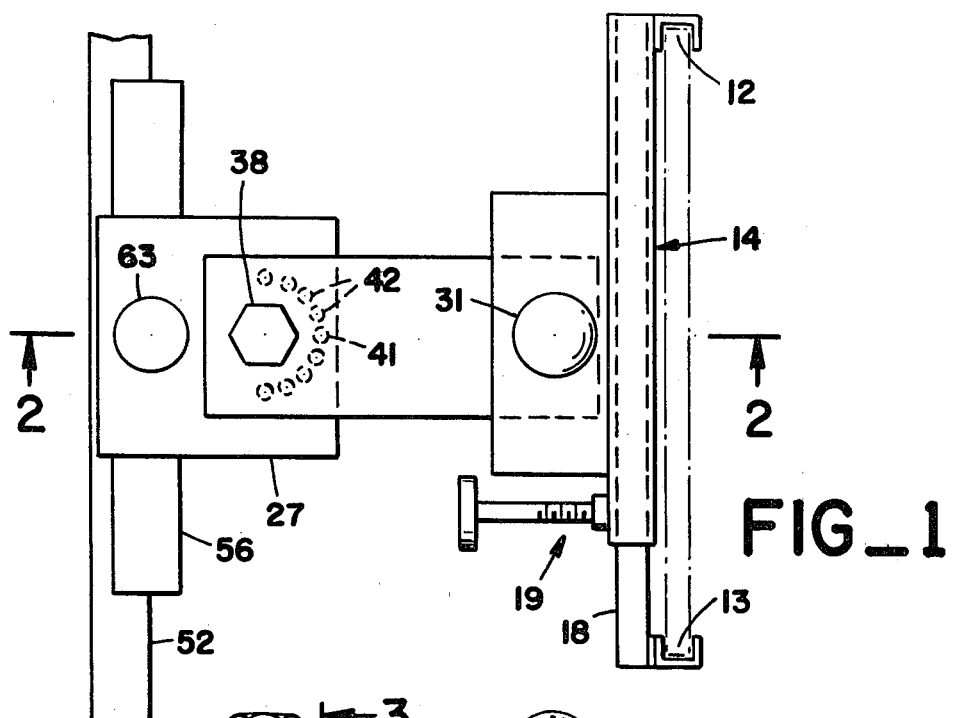
FIG_1
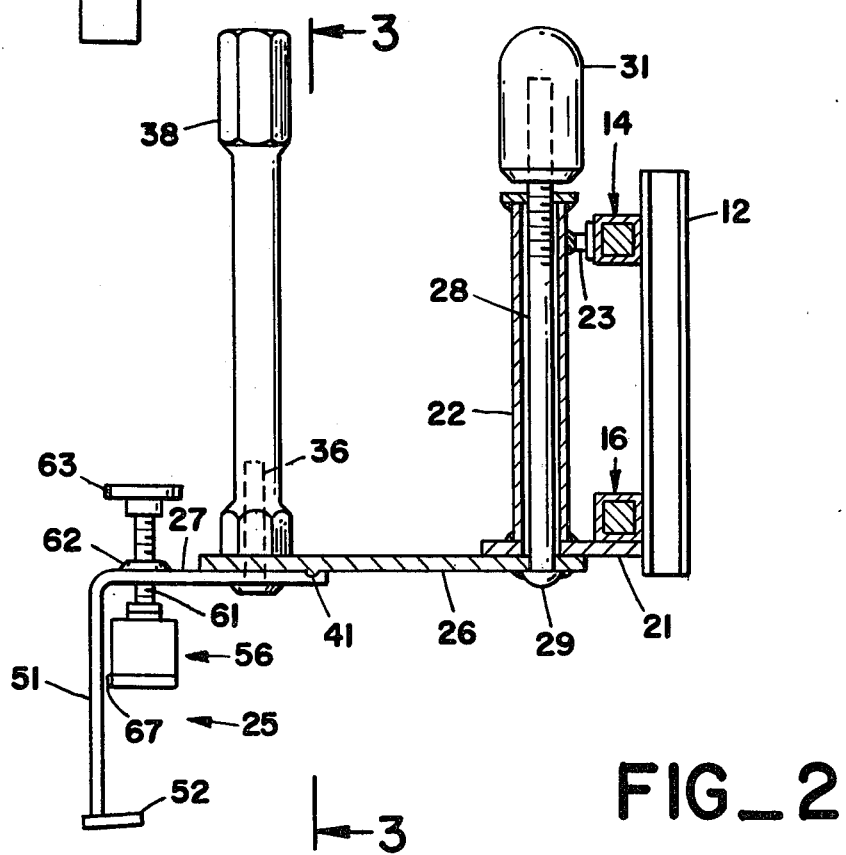
FIG_2

U.S. Patent   Aug. 16, 1983   Sheet 2 of 2   4,399,552
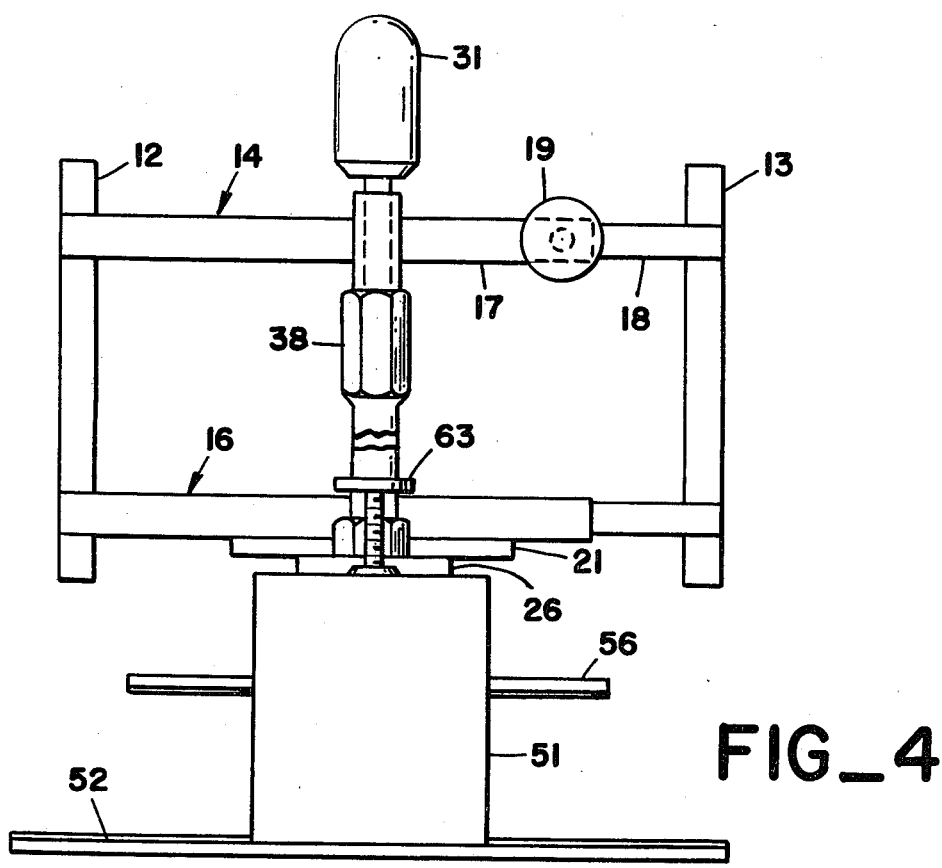
FIG_4
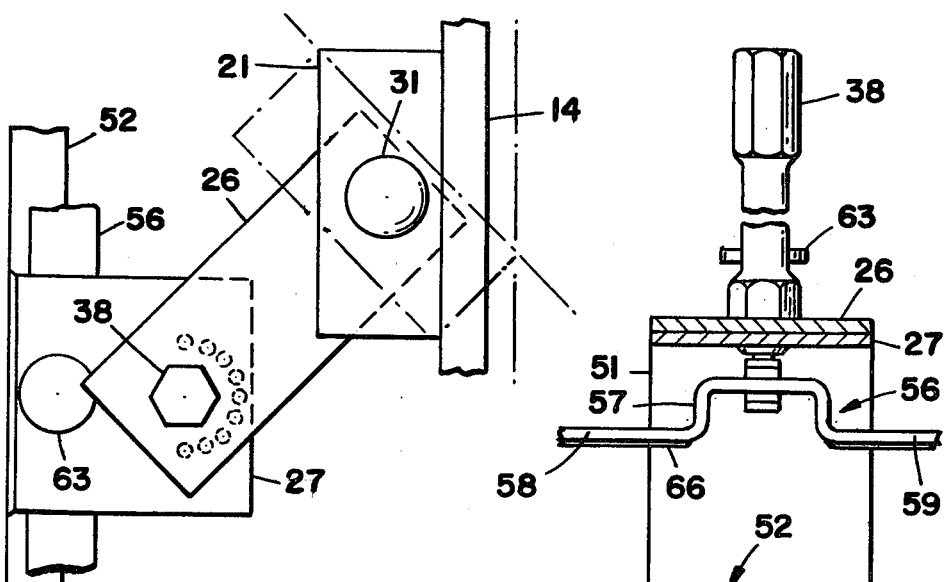
FIG_5
FIG_3

CROSSTABLE X-RAY CASSETTE HOLDER

RELATED APPLICATIONS

This is a continuation-in-part of my prior copending patent application Ser. No. 166,609 filed July 7, 1980 and entitled, "CROSSTABLE X-RAY CASSETTE HOLDER" and now U.S. Pat. No. 4,333,014.

SUMMARY OF INVENTION

The film cassette holder or mount of the present invention has a pair of facing U-shaped end retainers mounted on slide bars of adjustable length with locking means for setting the retainer spacing to accept film of different dimensions. The slide bars are fixed in spaced relation upon a vertical cylinder about a mounting post with a lock or tightening means for setting the angular position of the plane of the retainers.

A horizontal pivot link or arm carrying the mounting post is in turn pivotally carried by a mounting plate having a pivot pin shaft extending vertically upward therefrom with means for tightening the link and mounting plate together. A small boss faces an arc of indentations between the link and mounting plate for firmly locking them in any adjusted angular relation.

The holder of the present invention is adapted to be mounted at a top side of an X-ray table and to hold or restrain a cassette of X-ray film that rests upon the table top. This mounting is herein accomplished by a mounting unit having a narrow bottom plate carried by a leg depending from a top mounting plate and a clamping plate threadably carried by the top plate for clamping the edge of an X-ray table top.

The holder may be moved laterally and longitudinally of the table and may be pivoted about a vertical axis to accommodate a wide variety of different crosstable radiographs. Tilting of the table up to 90° does not displace the film retained by the present invention.

BACKGROUND OF INVENTION

Various types of X-ray film and cassette holders have been developed so that technicians or the like need not hold the film during exposure to X-rays. Examples of adjustable plate and cassette holders are to be found in U.S. Pat. Nos. 2,919,625, 2,919,873, 3,072,788, 3,634,685, 3,694,653, 3,771,781, and prior art cited therein. Some prior devices provide for positioning the patient and the film; however, none provide a completely satisfactory cross table holder capable of multiple adjustments for maximum flexibility.

DESCRIPTION OF FIGURES

The present invention is illustrated as to a single preferred embodiment in the accompanying drawings, wherein:

FIG. 1 is a top plan view of a holder in accordance with the present invention;

FIG. 2 is a central vertical sectional view taken in the plane 2—2 of FIG. 1;

FIG. 3 is a partial sectional view taken in the plane 3—3 of FIG. 2;

FIG. 4 is a rear elevational view of the holder of FIG. 1; and

FIG. 5 is a top plan view of the holder of FIG. 1 in pivoted position and illustrating another pivoted position in phantom.

DESCRIPTION OF PREFERRED EMBODIMENT

Referring to the drawings, there will be seen to be illustrated a preferred embodiment of the present invention including a pair of end retainers or clamping means 12 and 13 having the form of a facing vertical U-shaped channels. These retainers are carried by upper and lower support or slide bars 14 and 16 respectively. The support bars may be the same and each are provided as a hollow rectangular tube 17 having a mating rod 18 slidably disposed therein and extending from one open end thereof. Locking means 19 are provided as a bolt having an enlarged head for hand gripping and threaded through the tube 17 for tightening against the rod 18 so as to fix the longitudinal extent of the support bar 14. The retainer 12 is secured to the support bars 14 and 16 at one end as by brazing or welding and the other retainer 13 is secured to the rods 18 of the support bars 14 and 16 in like manner. In one preferred embodiment of the present invention the retainers 12 and 13 have a channel width of the order of ¾ of an inch so as to readily receive an X-ray cassette disposed between the retainers which are drawn snugly against the vertical ends of the cassette to thus retain the cassette in the holder.

A pivot plate 21 is secured to the lower support or slide bar 16 in horizontal extension rearwardly therefrom with a vertical cylinder 22 fixedly mounted on the plate in extension upwardly therefrom. A short rod 23 is secured between the upper support or slide bar 14 and the vertical cylinder 22.

A pivot link 26 extends from the underside of the pivot plate 21 horizontally into pivotal engagement with a top mounting plate 27 of a mounting unit 25. The pivot plate 21 and link 26 are pivotally connected to each other by an elongated bolt 28 extending through the cylinder 22 with a head 29 disposed beneath and fixed with respect to the link 26. A washer 30 is welded to the top of the cylinder 22 with an opening fitting the bolt 28 extending therethrough. An enlarged head or handle 31 is threaded on the upper end of the bolt 28 so that the handle may be turned to bear on the washer 30 and tighten the link 26 and plate 21 together in any desired pivotal relationship.

The pivot link 26 lies flat upon the mounting plate 27 and is pivotally connected thereto by a pivot pin 36 extending vertically through the link and plate with an enlarged lower end welded to the plate 27. A knob or handle 38 is threaded on the upper end of the pivot pin 36 so that manually turning this knob 38 will tighten the link and plate together. In view of the fact that the link 26 may have a substantial length, provision is also made for firmly locking the pivotal relationship of link 26 and mounting plate 27 and this may be accomplished by the provision of a small projection or bump 41 on the underside of the link 26 adapted to mate with and fit into one of a plurality of small depressions 42 disposed in an arc of a circle about the pivot pin 36 in the upper surface of the mounting plate 27. Tightening of the link 26 against the mounting plate 27 with the projection 41 in one of the indentations 42 will thus positively lock the link in desired pivotal relationship to the mounting plate.

The cassette holder of the present invention is adapted to be mounted on a side of substantially any X-ray table by the universal mounting unit 25 hereof. This mounting unit includes a rigid top plate 27 having an integral depending leg 51 formed as a right angle bend of the metal element forming both plate and leg. An elongated narrow bottom plate 52 is welded to the bottom of the leg 51 along both edges of the leg. This bottom plate extends longitudinally from each side of the leg 51 and extends underneath the top plate 27 with a small upward inclination, as shown in FIG. 2. The bottom plate 52 is adapted to be placed underneath a side edge of a table top and some tables have only a limited distance from the edge to support structure under the table top so that this bottom plate is thus made rather narrow, as of the order of one inch across. The bottom plate 52 extends slightly outward of the leg 51 to provide for a fillet weld to ensure rigidity of leg and plate connection.

The mounting unit also includes a clamping plate 56 disposed beneath the top plate 27 and adjacent the leg 51 in extension longitudinally above the bottom plate but short of the ends thereof, as shown in FIGS. 3 and 4. The clamping plate 56 has an inverted U-shaped central portion 57 and horizontal ends 58 and 59 extending from the lower ends thereof. These ends 58 and 59 are disposed above and generally parallel to the bottom plate but in a horizontal plane as viewed in FIG. 3. The clamping plate is mounted for vertical movement by a threaded shaft 61 extending vertically through the top plate 27 in threaded engagement with a nut 62 welded thereto and having hand gripping means such as a wheel or disc 63 affixed to the top of the shaft above the top plate. The shaft 61 extends through the raised central portion 57 of the clamping plate 56 and is secured thereto as by nuts and locking nuts above and below the plate, as shown in FIG. 3. Turning of the hand wheel 63 will thus lower or raise the clamping plate 56. Facing surfaces of the clamping plate 56 and bottom plate 52 are provided with a coating 66 of rubber or the like to minimize slippage on a table top and prevent scratching thereof. One or more small projections 67, such as heads of screws threaded into the clamping plate, are provided on the outer side of the clamping plate to ride along the leg 51 as the clamping plate is raised or lowered.

The cassette holder of the present invention is readily employed by a technician, doctor or the like to hold X-ray film for cross table radiography. The bottom plate 52 of the mounting means is slid under the side edge of an X-ray table top with the leg 51 abutting the side and the hand wheel 63 rotated to lower the clamping plate against the upper surface of the table top and the wheel is further turned to clamp the unit onto the table. The slight lateral inclination of the bottom plate counteracts a tendency for the holder to pivot during clamping because of the limited extension of the bottom plate 52 beneath a table top. The slide bars or support bars 14 and 16 are then adjusted in length so that the retainers 12 and 13 are disposed a desired distance apart to receive the particular cassette to be employed. Different size X-ray film plates or casettes are employed for different purposes and the present invention is adapted to hold cassettes or plates of varying sizes. The cassette is then slid into the holder between the end retainers 12 and 13 so that the cassette or plate comes to rest upon the top of the table. The film may then be oriented as desired for different procedures and pictures by loosening the handles 31 and 38 so that the retainers 12 and 13 may be pivoted about into desired position. Alternate positions are generally illustrated in FIG. 5 wherein the pivot link 26 is shown to be pivoted to an angle of about 45° from the position shown in FIG. 1. The pivot plate 21 and link 26 are also shown to be pivoted in the opposite direction about 45° from the position shown in FIG. 1 so that the slide or support bars 14 and 16, and thus the film, is aligned with the side of a table top but spaced a lesser distance from the side of the table. Alternatively, the pivot plate 21 and link 26 may, for example, be maintained in the position of FIG. 1 so as to dispose the support bars and thus the film in the 45° position shown in phantom in FIG. 5.

One of the advantageous capabilities of the present invention is that of retaining X-ray film, plate or cassette thereof in desired relationship to a patient or the like upon a table that is adapted to be tilted up to 90° in either direction so as to place the patient's head upward or downward. Such tilting of an X-ray table is well known and is employed for different X-ray shots. It will be seen that the end retainers 12 and 13 of the present invention firmly engage the X-ray film in a cassette or plate to prevent possible movement thereof relative to the table after the holder of the present invention has been locked in position. This is highly advantageous, for prior art holders have not normally been adapted to retain film under these conditions.

It is furthermore noted that the additional positive locking means between the pivot link 26 and mounting plate 27 of the present invention provides a further degree of surety and safety against inadvertant displacement of the film by possible bumping of the holder during use or adjustment of table or patient. While such additional locking means could also be provided between the pivot plate 21 and pivot link 26 it is not necessary to do so inasmuch as the retaining means are only slightly displaced from the pivot link so that only a short lever arm exists and threaded locking is adequate.

The present invention has been described above with respect to a single preferred embodiment thereof; however, it will be appreciated by those skilled in the art that various modifications and variations are possible within the scope of the present invention and thus it is not intended to limit the invention to the precise details of illustration or terms of description.

What is claimed is:

1. An adjustable cross table film holder having film clamping means carried by a pivot plate pivotally engaging a link pivotally mounted on a mounting unit in adjustable pivotal relation thereto and said mounting unit having a leg depending from one side of a top mounting plate with a narrow bottom plate extending from the bottom of said leg beneath said top plate and a clamping plate disposed adjacent said leg above said bottom plate and movably mounted with respect to said top and bottom plates for clamping an X-ray table edge between clamping plate and bottom plate.

2. The film holder of claim 1 further defined by the bottom plate of said mounting unit being inclined upwardly in extension from said leg for improved gripping of a table edge.

3. The film holder of claim 1 further defined by said clamping plate being mounted on said top plate by a shaft threadably engaging said top plate with hand gripping means atop said shaft for manual rotation to move said clamping plate to clamp a table edge having said bottom plate disposed beneath at least a portion of the table edge.

4. The film holder of claim 3 further defined by said clamping plate being disposed adjacent said depending leg and having at least one protuberance thereon for engaging said leg and sliding therealong as said clamping plate is moved by turning said shaft.

5. The film holder of claim 3 further defined by said bottom plate having a greater length than said clamping plate and extending beyond each end of said clamping plate.

6. The film holder of claim 1 further defined by said top plate and leg being formed as a single integral rigid element having a right angle bend at the juncture of top plate and leg for maximum strength.

7. The film holder of claim 1 further defined by all elements of said mounting unit being formed of metal and at least the facing surfaces of said clamping plate and bottom plate having a plastic coating for improved gripping of a table edge.

8. The film holder of claim 1 further defined by said bottom plate extending beneath said clamping plate at least one half of the width of said clamping plate.

9. The film holder of claim 1 further defined by said clamping plate having an inverted U-shaped central section with substantially horizontal ends extending therefrom and said clamping plate being adjustably mounted beneath said top mounting plate at the middle of said central section.

* * * * *